United States Patent [19]

Glancy et al.

[11] 3,917,659

[45] Nov. 4, 1975

[54] SOLID GLYOXAL-UREA PRODUCTS

[75] Inventors: Charles William Glancy; George Macon Bryant, both of Charleston, W. Va.

[73] Assignee: Union Carbide Corporation, New York, N.Y.

[22] Filed: July 27, 1974

[21] Appl. No.: 446,414

[52] U.S. Cl. ............ 260/555 R; 260/553; 260/96.5; 117/161 L; 252/8.6
[51] Int. Cl.² ...................................... C07C 126/08
[58] Field of Search ..................... 260/555 R, 553 R

[56] References Cited
OTHER PUBLICATIONS
Behrend et al., Annalen der Chemie, Band 339, pp. 1–8 (1905).

Taral, Chemical Abstracts, Vol. 48, col. 14,222 a–d (1954).

*Primary Examiner*—Bernard Helfin
*Assistant Examiner*—G. Breitenstein
*Attorney, Agent, or Firm*—F. M. Fazio

[57] ABSTRACT

Dry, solid urea-glyoxal products obtained by drying the reaction product of from 0.25 mole to 0.9 mole of urea per mole of glyoxal have been produced for the first time. These products are useful in paper coating compositions and in permanent press application.

2 Claims, No Drawings

SOLID GLYOXAL-UREA PRODUCTS

BACKGROUND OF THE INVENTION

The use of glyoxal and urea in paper coating compositions and in permanent press applications is well-known. Normally, these components are individually added to the treating bath in the desired proportions. However, glyoxal is usually available commercially as an aqueous solution and, consequently, unless a proper adjustment is made in the amount added it may dilute the treating bath to an unnecessary extent. Attempts have been made to recover glyoxal in a solid form to overcome this problem but these attempts have resulted in an impure glyoxal product containing an appreciable amount of an inorganic salt, the presence of which, in many instances, affects the final properties of the treated article. A solid form of urea-glyoxal would be of great commercial importance and interest since it would permit formulations having higher solids content and, further, one could, if desired, preblend the solid urea-glyoxal with the dry starch normally used in paper coating compositions and industrial adhesive compositions and as a consequence there would be no requirement for the addition of other additives when the starch is compounded, dispersed or formulated to achieve the satisfactory level of water resistance desired. For use in the textile field, urea as the coreactant present in a solid urea-glyoxal product is preferred over an inorganic salt because urea is added to glyoxal and formaldehyde to form the resin used in permanent press applications.

BRIEF DESCRIPTION OF THE INVENTION

Attempts have been made to recover glyoxal as a solid essentially free or inorganic salts from its aqueous solution but these attempts have not been too successful. We have now found that a solid urea-glyoxal derivative can be produced for use as an insolubilizer for starch in paper coating compositions and in adhesive compositions. These solid products can also be further reacted at a subsequent time with additional urea and formaldehyde under the known conditions for the preparation of textile cellulose resins that impart permanent press properties to fabrics.

The present invention relates to the production of a solid urea-glyoxal. This solid product is produced by reacting about 0.25 mole to about 0.9 mole of urea per mole of glyoxal, preferably from about 0.45 mole to 0.65 mole of urea per mole of glyoxal, and then recovering the product thereof in solid form. This reaction is carried out by mixing the proper amounts of the two components in an aqueous medium at ambient temperature; however, if desired, elevated temperatures up to the boiling point of the reaction mixture can be used. The reaction solution is then preferably spray dried at an elevated temperature to remove the water. The preferred manner of drying is spray drying since this procedure yields the urea-glyoxal solid in the desired chemical and physical form at high rates of production. Nevertheless, one could, if desired oven dry or freeze dry. The spray drying process is wellknown and an inlet temperature of from about 135° to about 200°C. or higher and a cone temperature of from about 50° to about 100°C. can be used. While the reaction solution can be readily spray dried when the mole ratio of urea:glyoxal is at least about 0.25:1, use of lower mole ratios present problems in spray drying. However, when the mole ratio is below this value, the dry product can be obtained by careful oven drying followed by grinding to the powder form. The spray drying will yield a product in which the urea and glyoxal are present in the same ratios as charged and which normally contain not more than about 5 to 10 weight percent of water.

The structure or composition of the dried product cannot be set forth with any degree of certainty, other than that the ratio of urea to glyoxal is the same as that charged, since complex reaction mechanisms are involved. The information available to date indicates that the product is a mixture. The information presently available indicates that the reaction product of from 0.5 to 0.75 mole of urea per mole of glyoxal is a mixture of compounds and that it contains a small amount of unreacted glyoxal, a small amount of 4,5-dihydroxyl-2-imidazolidone (less than 15 percent), with the bulk of the reaction product being a mixture of low molecular weight oligomers or polymeric molecules. This information was established by gel permeation chromatography and substantiated by infrared analysis curves and nuclear magnetic resonance spectra. The average molecular weight of the reaction product will vary from about 250 to about 325.

Gel permeation chromatography also showed that at a 0.3:1 ratio of urea to glyoxal an appreciable amount of unreacted glyoxal was present, a trace of oligomer or polymer, and a small amount of 4,5-dihydroxyl-2-imidazolidone (DHI) was noted. At a 0.55:1 ratio there was a trace of unreacted glyoxal, a small amount of 4,5-dihydroxyl-2-imidazolidone, and the balance was low molecular weight polymeric species. Similar results were observed for the 0.7:1 mole ratio product as for the 0.55:1 mole ratio product. At a mole ratio of 1:1 gel permeation chromatography showed that essentially the sole product present was 4,5-dihydroxyl-2-imidazolidone; there was no evidence of unreacted glyoxal and a mere trace of polymeric material; the average molecular weight of this reaction product was 131. At a mole ratio of 0.9:1 the gel permeation chromatography curve is similar to that obtained when the mole ratio was 0.7:1. However, the reaction product obtained in this latter case was not as effective in a pigmented paper coating composition containing starch as the binder in yielding good immediate water resistance as measured by wet rub resistance. The above comments are summarized in the following table:

| Mole ratio urea:glyoxal | Polymeric Constituent Present | Glyoxal Present | DHI Present |
|---|---|---|---|
| 0.3:1 | trace | balance | 5 |
| 0.55:1 | balance | trace | 7 |
| 0.7:1 | balance | trace | 12 |
| 1:1 | trace | none | ~100 |

Gel permeation chromatography is determined according to the procedure described by J. C. Moore and J. G. Henrickson in the Journal of Polymer Science, Part C 8 (1965) 233-241.

The data above was obtained using a duPont Model 820 Liquid chromatography apparatus having a column one meter long by 0.5 mm inside diameter that was packed with gel particles 25 to 100 microns in size of Sephadex LH-20 (Registered Trademark), a hydroxy-propylated dextran gel. Sample weight was 0.2 mg. Water was used as the eluent at a rate of 0.206 ml.

per minute. The temperature was kept at 26°C. The detector used was a differential refractometer to measure change in refraction of the material as it is eluted from the column and this was plotted against the time required for the material to elute. Normally, a test under these conditions requires about 1.5 hours.

The average molecular weight is obtained by conventional osmometric analytical methods.

Thus, although the structure or structures of the reaction products cannot be defined with a definite degree of reasonableness, we have found, as stated previously, that the mixture of reaction products, whatever they may be, produced by reacting 0.25 to 0.9 mole of urea per mole of glyoxal is extremely suitable for producing a dry, solid urea-glyoxal.

The dried urea-glyoxal solid is normally a free-flowing product that can be readily added to the treating bath or blended with dry starch. The solid urea-glyoxal product can be used in the production of paper coating compositions that contain the usual and well-known additives heretofore present in such compositions, including pigments (clay, titanium dioxide, calcium carbonate), lubricants, latexes, as well as dyes and colored pigments (such as ultramarine blue or carbon black), perfumes, bactericides, slimicides, etc. Any of the usual starches well-known to those skilled in the art can be used together with the above additives, whether natural starch or modified starch, together with the solid urea-glyoxal product to produce the paper coating compositions. Those skilled in the art are fully aware of the amount of starch present in such paper coating compositions and the various types available, as well as the amounts of each respective additive used. These conventional amounts are satisfactory for use in this invention and will vary depending upon the ultimate product to be produced, a fact known in the art.

In a typical paper coating composition the total solids content will vary from about 40 percent to about 70 percent by weight and it will contain from about 2 percent to about 15 percent, preferably from about 5 percent to about 10 percent, of the solid urea-glyoxal adduct of this invention, based on the weight of the starch. These coating compositions are applied by the conventional methods known in the art and do not require further explanation herein.

The following examples further serve to illustrate the invention.

EXAMPLE 1

There were charged 33 parts of urea to 145 parts of 40 percent aqueous glyoxal solution and the mixture was stirred at 45°C. for 15 minutes and then cooled to 25°C. The mole ratio of urea:glyoxal was 0.55:1. A 100 grams portion was placed in a pan and oven dried at 50°C. over a 96 hour period. A white, brittle residue was obtained that was readily powdered. The dry, solid urea-glyoxal product was evaluated in a starch-clay paper coating composition having the following composition:

| | |
|---|---|
| No. 2 Grade coating clay | 100.0 parts |
| Sodium pyrophosphate decahydrate | 0.1 part |
| Hydroxyethylated starch | 18.0 parts |
| Dry urea-glyoxal product | 1.8 parts |

Water to make 50.7 percent total solids mixture. This composition was identified as Composition A. Comparisons were made with other coating compositions using a portion of the aqueous urea-glyoxal solution before it was dried (Composition B) and a composition containing no urea or glyoxal whatsoever (Composition C). The results showed that the dry solid urea-glyoxal product was as effective as the original aqueous solution in improving the wet rub resistance properties and that the coating composition had a slightly lower Brookfield viscosity. In the absence of both urea and glyoxal (Composition C), the wet rub resistance properties were poor.

The coating compositions were evaluated by applying them to 50 lb./ream paper base stock at a loading of approximately 10 lb./ream. The coated papers were dried on a steam heated drum at 200°F. for 30 seconds. Some of the coated paper was then further cured at 110°F. for 10 minutes. In all instances the coated sheets were supercalendered by two passes between the rolls at a pressure of 1000 pounds and a temperature of 150°C. The coated sheets were conditioned for several hours at room temperature and 50 percent relative humidity before they were tested for wet rub resistance. In this test a high per cent transmission (%T) is desired as this indicates low extraction of the coating from the paper. The results are tabulated below:

| Coating Composition | Brookfield Viscosity, cps at 50°C. and 10 rpm | Wet Rub Resistance, %T TAPPI RC - 184 | |
|---|---|---|---|
| | | Dried | Cured |
| A | 14,400 | 65 | 70 |
| B | 16,000 | 75 | 80 |
| C | 7,520 | 11 | 14 |

It was also found that the dry, solid urea-glyoxal could be added to the coating composition during the starch pasting step with equivalent results; in such instance the coating composition had a Brookfield viscosity of 15,000 cps and wet rub resistance of 70, dried, and 78, cured.

EXAMPLE 2

There were charged 33 parts of urea to 145 parts of a 40 per cent aqueous glyoxal solution and the mixture was stirred at 45°C. for 15 minutes and then cooled to 25°C. The mole ratio of urea:glyoxal was 0.55:1. A portion of the aqueous reaction product was spray dried in a Niro Spray Dryer operating at an inlet temperature of 155°C. and a cone temperature of 65°C. The solid urea-glyoxal product recovered was a dry white powder having a 7.6 percent moisture content. Paper coating compositions were prepared according to the following formulation:

| | |
|---|---|
| No. 2 Grade coating clay | 100.0 parts |
| Sodium pyrophosphate decahydrate | 0.1 part |
| Hydroxyethylated starch | 18.0 parts |
| Dry urea-glyoxal product | 1.8 parts |

Water to make 50.7 percent total solids mixture. This composition was identified as Composition A. Comparisons were made to other coating compositions using a portion of the aqueous solution of urea and glyoxal before it was dried (Composition B), the 40 percent aqueous glyoxal alone (Composition C) and a composition containing no urea or glyoxal whatsoever (Composition D). The results showed that the spray dried urea-glyoxal product was fully equivalent to the original aqueous solution in wet rub resistance and Brookfield viscosity properties. The ability to produce and use a dry, solid urea-glyoxal adduct is a distinct commercial advantage in that it permits easier adjustments of the coating composition, when needed, and simplifies storage since the dry solid product has better storage characteristics than does the liquid mixture, both from a stability point of view and space requirements. The use of aqueous glyoxal alone (Composition C) was not as satisfactory since the Brookfield viscosity was higher. In the absence of both urea and glyoxal (Composition D), the wet rub resistance properties were much poorer. The results are tabulated below:

| Coating Composition | Brookfield Viscosity, cps at 50°C. and 10 rpm | Wet Rub Resistance,%T TAPPI RC - 184 | |
| --- | --- | --- | --- |
| | | Dried | Cured |
| A | 4,540 | 81 | 80 |
| B | 4,160 | 77 | 79 |
| C | 7,080 | 85 | 84 |
| D | 4,100 | 47 | 43 |

EXAMPLE 3

Following the procedure described in Example 2, a series of runs was performed to produce a dry, solid urea-glyoxal adduct product. In this series the mole ratio of urea to glyoxal was varied. In all instances a free flowing powder was obtained.

| Mole Ratio of Urea:Glyoxal | Aqueous Reaction Product, grams | Dry Adduct grams |
| --- | --- | --- |
| 0.9:1 | 4,266 | 1,157 |
| 0.75:1 | 3,982 | 1,393 |
| 0.3:1 | 4,630 | 1,136 |
| 0.25:1 | 2,116 | 638 |
| 0.15:1 | 2,853 | 338 |

The example shows that a suitable dry product can be produced within the urea-glyoxal range recited. The powders are useful as indicated in this application. The poor yield at the low urea:glyoxal ratio can be explained as due to loss of unreacted glyoxal by volatilization.

EXAMPLE 4

A starch cook was prepared using 100 grams of starch, 390 grams of water and 7.7 grams of a dry, solid urea-glyoxal adduct in which the ratio of urea to glyoxal was 0.55:1. A paper coating composition was then prepared according to the following formulation:

| Clay, 70% solids | 286 parts |
| --- | --- |
| Water | 6 parts |
| Starch cook | 180 parts |
| Calcium stearate | 4 parts |

The composition had a Brookfield viscosity of 45,600 cps at 50°C. and 10 rpm. It was evaluated on rawstock and the following results were obtained:

| Property | Dried | Cured |
| --- | --- | --- |
| Brightness, % | 80.0 | 80.5 |
| Gloss, % | 46 | 49 |
| Wet Rub Resistance,%T | 65.5 | 68.5 |

EXAMPLE 5

A starch cook was prepared using 100 grams of starch, 390 grams of water and 7.4 grams of a dry, solid urea-glyoxal adduct in which the ratio of urea to glyoxal was 0.55:1. A paper coating composition was then prepared according to the same formulation set forth in Example 4. This composition had a Brookfield viscosity of 33,000 cps at 50°C. and 10 rpm. It was evaluated on paper rawstock and the following results were obtained:

| Property | Dried | Cured |
| --- | --- | --- |
| Brightness | 81.0 | 80.0 |
| Gloss | 48 | 47 |

EXAMPLE 6

A composition was prepared for treating fabrics to impart durable press properties to the fabric. Ninety one grams of a dry, solid urea-glyoxal adduct, in which the ratio of urea to glyoxal was 0.55:1, were added to a mixture of 160 grams of a 37 percent aqueous formaldehyde solution and 87 grams of water. After stirring for a short while 27 grams of urea were added and the pH was raised to 5.5 with a 30 percent aqueous sodium acetate solution. The pH was then raised to 7 and maintained at 7 while the mixture was heated to 60°C. and stirred at that temperature for 2 hours. After cooling to room temperature 7 grams of water were added to make a 45 percent solution. When this was applied to fabric, durable press properties were imparted thereto.

What we claim is:

1. A dry, solid urea-glyoxal reaction product mixture having an average molecular weight of from about 250 to about 325, said reaction product mixture produced by the reaction of urea and aqueous glyoxal, wherein the ratio of urea to glyoxal is from 0.25 mole to 0.9 mole of urea per mole of glyoxal, at a temperature of from ambient up to the boiling point, and thereafter drying and recovering said reaction product mixture.

2. A dry, solid urea-glyoxal reaction product mixture having an average molecular weight of from about 250 to about 325, said reaction product mixture produced by the reaction of urea and aqueous glyoxal, as claimed in claim 1, wherein the ratio of urea to glyoxal is from 0.45 mole to 0.65 mole or urea per mole of glyoxal, at a temperature of from ambient up to the boiling point, and thereafter drying and recovering said reaction product mixture.

* * * * *